United States Patent [19]
Gladfelter et al.

[11] Patent Number: 5,849,379
[45] Date of Patent: Dec. 15, 1998

[54] WRAPPABLE SLEEVE

[75] Inventors: Harry F. Gladfelter, Kimberton; Robert J. Brushafer, West Chester, both of Pa.

[73] Assignee: Bentley-Harris Inc., Exton, Pa.

[21] Appl. No.: 779,110

[22] Filed: Jan. 6, 1997

[51] Int. Cl.[6] .................................................. B29D 22/00
[52] U.S. Cl. ...................... 428/35.8; 428/35.9; 428/36.1; 428/36.91
[58] Field of Search ................................ 428/35.8, 35.9, 428/36.1, 36.91

[56] References Cited

U.S. PATENT DOCUMENTS

| | | | |
|---|---|---|---|
| 1,813,039 | 7/1931 | Escol . | |
| 3,060,069 | 10/1962 | Sindars | 154/45 |
| 4,214,147 | 7/1980 | Kraver | 219/301 |
| 4,442,585 | 4/1984 | McGehee, Sr. et al. | 29/432 |
| 4,570,679 | 2/1986 | Schippl | 138/149 |
| 4,970,351 | 11/1990 | Kirlin | 174/68.3 |
| 5,304,408 | 4/1994 | Jarosz et al. | 428/75 |
| 5,435,871 | 7/1995 | Streit | 156/201 |
| 5,617,900 | 4/1997 | Weil | 138/127 |

FOREIGN PATENT DOCUMENTS

| | | | |
|---|---|---|---|
| 011196 | 5/1980 | European Pat. Off. | F16L 59/14 |
| 224824 | 6/1987 | European Pat. Off. | F16L 59/16 |
| 38 21 468 | 12/1989 | Germany | F16L 59/00 |
| 249215 | 4/1948 | Switzerland . | |

*Primary Examiner*—James J. Bell
*Attorney, Agent, or Firm*—Synnestvedt & Lechner

[57] ABSTRACT

A split sleeve for insulation of heat generating components, such as an exhaust gas recirculation device, comprises an outer layer of knitted woven or braided glass fiber yarn. A first metal wire skeleton or frame in the form of a continuous wire support for the outer layer is bent in a first step with a series of reverse bends to form a comb-like structure and in a second step to a C-shaped cross-sectional configuration in which the wire defines a cavity and the wire bends define an opening extending lengthwise of the cavity. A layer of heat insulating mineral paper is spaced from the cover layer by the metal wire skeleton. The heat insulating mineral paper is provided with a metal foil layer on the side away from the metal wire skeleton. A second metal wire layer configured like the first extends lengthwise of the sleeve and spaces the reflective surface of the foil from the heat generating component. The various layers of the sleeve are secured together to form an axially extending opening which fits over the component requiring insulation.

30 Claims, 2 Drawing Sheets

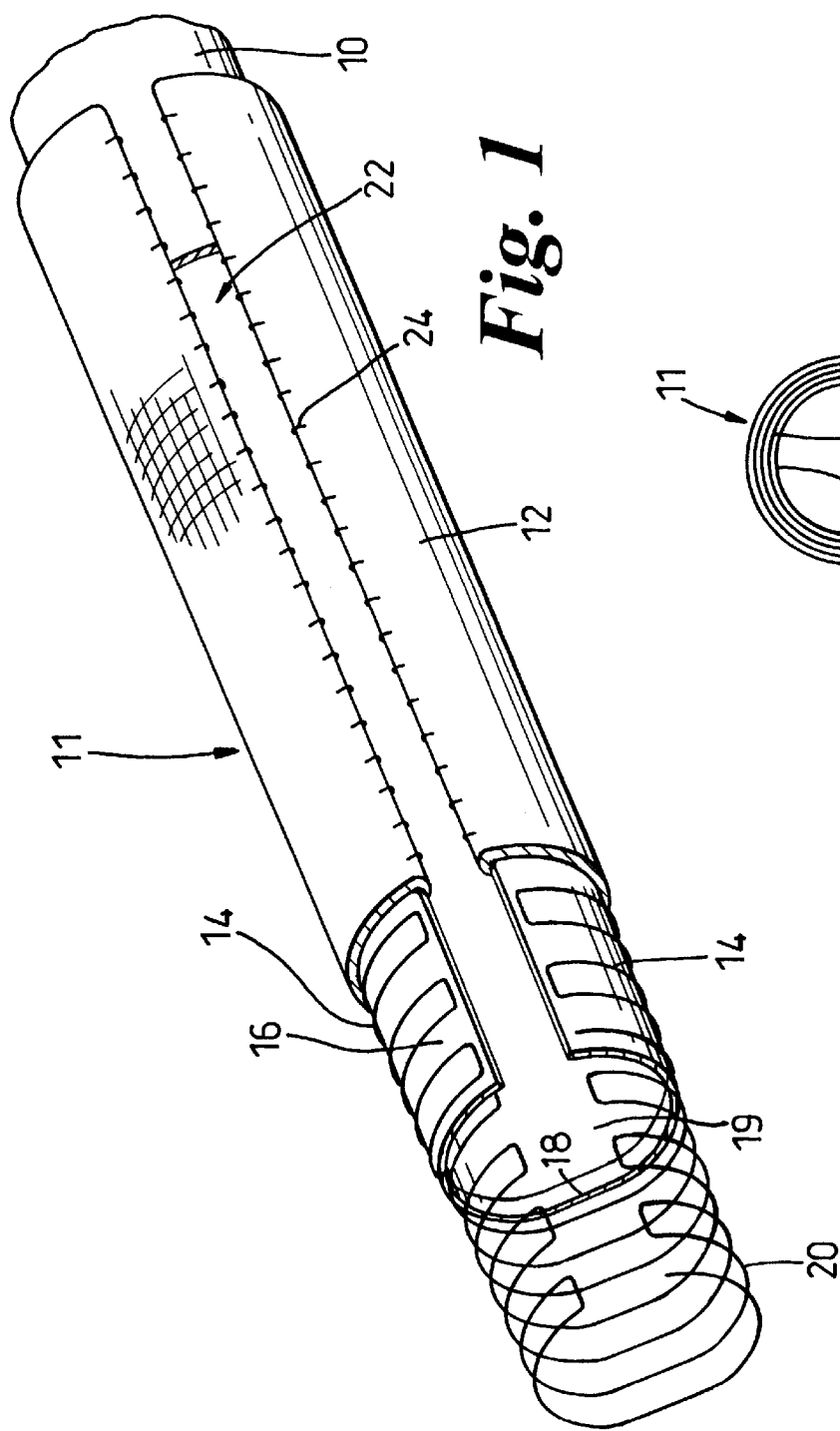
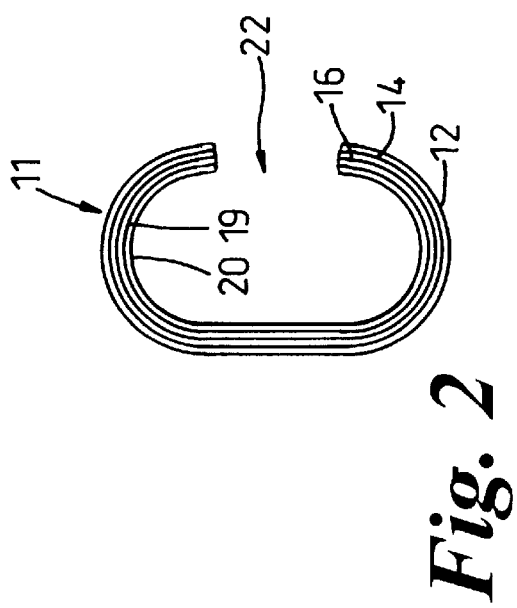
Fig. 1
Fig. 2

WRAPPABLE SLEEVE

FIELD OF THE INVENTION

This invention relates to multi-layered sleeving products having heat insulating and reflecting layers and more particularly to sleeving products for thermally insulating a high temperature device, such as an automotive exhaust gas recirculation tube.

BACKGROUND OF THE INVENTION

Various efforts have been made to provide relatively low cost, light-weight insulating sleeving for the purposes of thermally insulating high-heat generating components, such as exhaust gas recirculation tubes. In a modern automobile, the latest versions of these devices operate with inlet gas temperatures ranging from above about 1000° F. to about 1800° F. The devices generate undesirable heat which may discomfort the occupants within the passenger compartment and may damage nearby mechanical components and floor covering materials and have been known to cause fire if the vehicle is left idling when parked over dry grass.

A problem exists in dealing with these temperatures in that presently available insulating materials do not tolerate the high temperatures likely to be encountered very well. At best, they tend to degrade relatively rapidly. At the high end of the temperature range mentioned above, materials such as glass fiber insulating materials will melt. At present, no reasonably priced, low cost alternative has been found to be entirely satisfactory for this application.

Although sleevings having means providing an air space between the heat source and the insulating materials have been effectively utilized for many applications, an as yet unsatisfied need persists for a cost effective insulation sleeve having high durability for high temperature devices for use in modern high performance vehicles.

SUMMARY AND OBJECTS OF THE INVENTION

According to the invention, an insulating sleeve product is provided which is split lengthwise to fit over a heat generating component. The sleeve and yieldable product comprises an inner, first tubular spacer layer of a metal wire prebent to a C-shaped or clam shell cross-section, which layer is generally conformable to the outer surface of the heat generating component. The first tubular spacer layer of the invention supports an insulating layer of rockwool or like insulating material to which a metal foil is attached. The foil has a reflective face which is spaced from the heat generating component by the metal wire layer. A second layer of metal wire configured like the first is disposed to fit against the opposite surface of the layer of insulating material and spaces that layer from an outer layer of interlaced insulating yarn.

More particularly, the relatively fragile foil layer is preferably laminated to the mineral wool paper layer prior to construction of the sleeve. Since the need for adhesion between the paper and the foil exists only during assembly, inexpensive adhesives which may burn off during use are suitable for the purpose. Once the sleeving product is placed in use, the outer layers of wire and insulating yarn serve as the primary means to maintain the inner layers in place.

With the foregoing in view, a primary objective of the invention is the provision of high performance, durable, low cost heat insulating sleeving of light-weight construction useful for the insulation of high temperature exhaust gas recirculation products.

Further objects of the invention include the provision of heat insulating sleevings which are easy to install over previously installed devices, elimination of the need for additional attachment means and the provision of a sleeve which accommodates breakouts.

How the foregoing and other objects of the invention are achieved will become apparent from the following detailed description of a preferred embodiment of the invention.

BRIEF DESCRIPTION OF THE DRAWINGS

FIG. 1 is a perspective view of a split sleeve formed according to the invention with portions of the sleeve removed for illustrative purposes;

FIG. 2 is a end view of the sleeve of FIG. 1; and

DETAILED DESCRIPTION OF THE PREFERRED EMBODIMENT OF THE INVENTION

Figure 3:
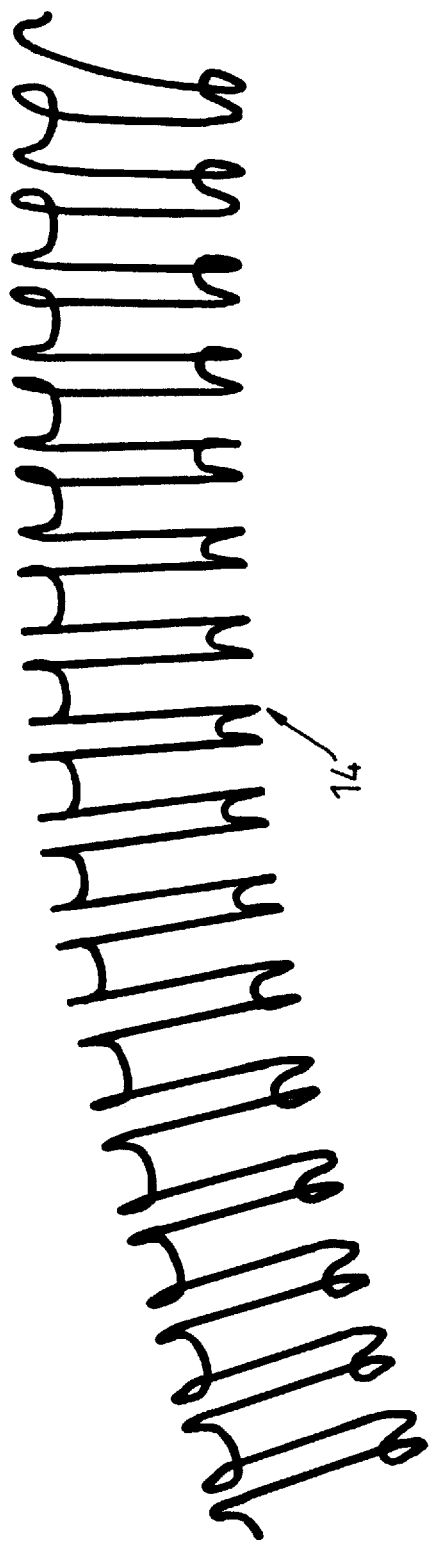
FIG. 3 is a view of a preferred form of prebent support wire utilized in carrying out the objectives of the invention.

With reference to FIG. 1, an exhaust gas recirculation device, partially shown generally at 10, is covered with an insulating sleeve 11 made according to the invention.

Sleeve 11 preferably comprises an outer covering layer 12 formed of an insulating, heat resistant yarn, such as glass fiber, relatively tightly interlaced as by weaving, braiding or knitting. A preferred material for cover layer 12 is E-glass yarn provided as three ends of continuous filament yarn of 3608 denier each. The cover layer is preferably tightly woven and is impregnated with a high temperature coating material, such as epoxy/silicone resin, which eliminates end fray and provides resistance to abrading of the glass fibers.

Located internally of the cover is a first wire support layer 14 comprising a continuous wire form of the type sold by Renz America of Agwan, Mass., and commonly used for the purpose of binding the pages of notebooks. This wire is first prebent into a so-called "comb configuration" by imparting to it spaced reverse bends and then formed into a C-shaped or clam shell cross-section in a separate processing step so that it defines an interior cavity with an opening formed along one side. A piece of the prebent wire of preferred shape is illustrated in FIG. 3. The wire form layer is readily flexible about its long axis and, while somewhat rigid, desirably should have sufficient ductility so as to stay in the shape to which it is crimped down when fitted over objects. The wire layer extends lengthwise of the sleeve, providing support to the cover layer and spacing for the next layer to be described subsequently. The wire of layer 14 is shown extending beyond the left-hand end of the cover layer 12 of tubular sleeve 11 in FIG. 1.

Located internally of the wire form layer 14 is a second insulating layer 16 formed of a material having a high heat insulating value. Preferably, layer 16 is a mineral wool felted material in which the mineral material is rockwool, although other mineral materials, such as glass fiber and ceramics in felted form, may be employed. In the illustrative embodiment, the felt has a thickness of about 2 mm. A suitable mineral wool felted material is available from Tenmat of Manchester, England, in a paper or felt of 2 mm thickness.

According to the invention, a foil layer 18 is bonded to the inner surface of insulating layer 16. The foil layer 18 preferably has a thickness of about 0.001 inches and has a reflective surface 19 directed inwardly towards the article to be protected. The foil layer may be adhesively secured to the paper by an adhesive which burns off in use.

A final layer 20 formed of metal wire, and preferably of the form similar to wire layer 14, is located internally of the tube and functions to maintain a spacing between the reflective foil surface and the device being insulated. In use for the insulation of exhaust gas recirculation devices, wire having a diameter of about 1 mm is considered to be adequate.

As can be seen with reference to FIGS. 1 and 2, the layers are interpositioned to provide a side opening 22 to allow for fitting the sleeve over the device being covered. The edges of the outer cover layer 12 are folded around the insulating layer 16 and secured in place by such stitching 24, as seen in FIG. 1, although other methods of securing the layers together may be employed. The stitching 24 extends through the loops of inner wire layer 20 so that the entire assembly is secured in place.

The ends of the finished product may be fitted with a C-shaped ferrule of metal, rubber or the like to eliminate end fray.

The prebent wire layers 14 and 20 are formed of a relatively ductile wire which allows for sufficient expansion of the sleeve to fit over the object being covered including irregularities, such as connector flanges. The wire desirably has sufficient resilience so that it acts to return the sleeve to a closed position in which it is clamped over the device and is retained in place without the need for clamps or straps. The sleeve so formed is readily bendable, allowing it to fit around curved pieces. The axial slit accommodates breakouts, such as pick-up tubes. A single sized tube accommodates EGR devices of a range of diameters. The product is durable and has enhanced insulation capabilities which are imparted by the various insulation layers and the spacing wire layers. The sleeving is easily installed without the need for special tools.

We claim:

1. A split sleeve adapted to be placed in surrounding relationship with a heat generating component, said split sleeve comprising:
   an outer cover layer of interlaced heat insulating yarn;
   a first metal wire layer comprising a continuous wire support bent in cross-section to a C-shaped configuration, said first metal wire layer defining a cavity having a side opening extending lengthwise of said sleeve and said continuous wire support being longitudinally flexible;
   an intermediate layer of a heat insulating material spaced from said outer cover layer by said continuous wire support;
   a metal foil layer adjacent to the intermediate layer on the side away from the first wire layer, said foil layer having a reflective surface exposed to said heat generating component; and
   a second metal wire layer extending lengthwise of the sleeve, said second wire layer having a configuration substantially the same as the first wire layer, said second wire layer interfacing with the surface of the foil away from the insulating layer, said second wire layer being adapted to space said reflective surface from the heat generating component, each of said layers having edge portions terminating at the boundaries of said side opening.

2. A split sleeve according to claim 1, wherein said intermediate layer of heat insulting material is a felt material.

3. A split sleeve according to claim 2, wherein said felt material is selected from the group comprising rockwool, glass fiber and ceramics.

4. A split sleeve according to claim 3, wherein said foil layer is adhesively bonded to said layer of heat insulating material.

5. A split sleeve according to claim 1, wherein said second wire layer comprises a second continuous wire bent in cross-section to a C-shaped configuration, said second continuous wire extending lengthwise of the sleeve and being longitudinally flexible.

6. A split sleeve according to claim 5, wherein said heat insulating layer is a felt material.

7. A split sleeve according to claim 6, wherein said felt material is a rockwool paper.

8. A split sleeve according to claim 7, wherein said foil layer is adhesively bonded to said rockwool paper.

9. A split sleeve according to claim 8, wherein said cover layer is comprised of glass fiber yarn.

10. A split sleeve according to claim 9, wherein said glass fiber yarn is a woven E glass yarn.

11. A split sleeve according to claim 10, wherein said cover layer further comprises an epoxy/silicone coating.

12. A split sleeve for insulation of a heat generating component such as an automotive exhaust gas recirculation device, said sleeve comprising:
    a first, outer layer comprised of woven glass fiber yarn;
    a layer of relatively non-resilient, bendable metallic wire, said wire being bent to a generally C-shaped configuration extending lengthwise of the sleeve and being flexible about its long axis;
    a layer of a heat insulating mineral paper spaced from said outer layer by said layer of bendable wire; and
    a spacer layer for maintaining an air space between said layer of heat insulating mineral paper and said heat generating component.

13. A split sleeve according to claim 12, wherein said spacer layer comprises a second layer of wire.

14. A split sleeve according to claim 13, further comprising a metal foil layer adjacent to the layer of heat insulting mineral paper on the side away from the first layer of wire, said metal foil layer having a reflective surface exposed to said heat generating component.

15. A split sleeve according to claim 14, wherein said second layer of wire comprises a relatively non-resilient, bendable metal wire bent in cross-section to a C-shaped configuration and being flexible about its long axis.

16. A split sleeve according to claim 15, wherein said woven glass fiber yarn is E glass.

17. A split sleeve according to claim 16, wherein said woven glass fiber yarn is coated with a layer of silicone material.

18. A split sleeve according to claim 16, wherein said metal foil layer is adhesively bonded to said layer of heat insulating mineral paper.

19. A split sleeve according to claim 17, wherein said layer of silicone material is an epoxy/silicone.

20. A split sleeve, comprising:
    a support layer comprising a continuous monofilament member formed into a multiplicity of spaced apart reverse bends forming a multiplicity of crests and troughs, said continuous monofilament member being further bent in cross section into a C-shaped configuration bringing said crests adjacent to said troughs so that said continuous monofilament member defines an axially extending interior region with an opening on one side bordered by said crests and troughs; and
    an outer layer surrounding and being supported by said support layer, said outer layer extending lengthwise of said support layer and further extending circumferentially about said support layer from said crests to said troughs, said support layer being disposed between said outer layer and said interior region.

21. A split sleeve according to claim 20, further including an inner layer disposed within said interior region and extending lengthwise of said support layer and circumferentially within said support layer from said crests to said troughs.

22. A split sleeve according to claim 21, wherein said inner layer is formed from a material different from said outer layer.

23. A split sleeve according to claim 22, wherein said continuous monofilament member comprises a metal wire.

24. A split sleeve according to claim 20, wherein said outer layer is formed from a woven textile material.

25. A split sleeve according to claim 20, wherein one of said layers is comprised of a heat reflective material.

26. A split sleeve according to claim 25, wherein said layer of heat reflective material is a metal foil.

27. A split sleeve according to claim 26, wherein said metal foil layer is said inner layer.

28. A split sleeve according to claim 27, wherein said outer layer is comprised of woven glass fiber yarn.

29. A split sleeve, comprising:
   a support layer comprising a continuous filament formed into a multiplicity of spaced apart reverse bends forming a multiplicity of crests and troughs, said filament being further bent in cross section into a C-shaped configuration bringing said crests adjacent to said troughs, said support layer thereby defining an interior region with an opening on one side bordered by said crests and troughs;
   an outer layer surrounding and being supported by said support layer, said outer layer extending lengthwise of said support layer and further extending circumferentially about said support layer from said crests to said troughs, said support layer being disposed between said outer layer and said interior region.

30. A split sleeve according to claim 29, wherein said outer layer has an edge portion wrapped around said crests and troughs extended into said interior region.

* * * * *